US009183308B1

(12) United States Patent
Mark

(10) Patent No.: US 9,183,308 B1
(45) Date of Patent: Nov. 10, 2015

(54) METHOD AND APPARATUS FOR SEARCHING THE INTERNET

(75) Inventor: William S. Mark, San Mateo, CA (US)

(73) Assignee: SRI International, Menlo Park, CA (US)

( * ) Notice: Subject to any disclaimer, the term of this patent is extended or adjusted under 35 U.S.C. 154(b) by 854 days.

(21) Appl. No.: 13/114,691

(22) Filed: May 24, 2011

Related U.S. Application Data

(60) Provisional application No. 61/349,642, filed on May 28, 2010.

(51) Int. Cl.
*G06F 17/30* (2006.01)
*G06F 7/00* (2006.01)

(52) U.S. Cl.
CPC ................. *G06F 17/30867* (2013.01)

(58) Field of Classification Search
CPC ............ G06F 17/30864; G06F 17/30867; G06F 17/30967
USPC .......................... 707/705, 758, 706
See application file for complete search history.

(56) References Cited

U.S. PATENT DOCUMENTS

| 6,289,337 | B1 * | 9/2001 | Davies et al. | 707/3 |
|---|---|---|---|---|
| 6,370,527 | B1 * | 4/2002 | Singhal | 707/6 |
| 6,385,602 | B1 * | 5/2002 | Tso et al. | 707/3 |
| 6,691,106 | B1 * | 2/2004 | Sathyanarayan | 707/3 |
| 7,814,096 | B1 * | 10/2010 | Roy | 707/721 |
| 8,504,411 | B1 * | 8/2013 | Subasic et al. | 705/7.33 |
| 2004/0254911 | A1 * | 12/2004 | Grasso et al. | 707/1 |
| 2007/0130126 | A1 * | 6/2007 | Lucovsky et al. | 707/3 |
| 2008/0172370 | A1 * | 7/2008 | Farouki | 707/5 |
| 2009/0164926 | A1 * | 6/2009 | Boyle et al. | 715/764 |

OTHER PUBLICATIONS

"C2RSS" Overview, downloaded on Oct. 12, 2011 from website: https://pal.sri.com/Plone/framework/Components/learning-applications/c2rss no date, 3 pages.

"Trapit", downloaded on Oct. 12, 2011 from website: http://trap.it/#!about Founded Jan. 2010, 2 pages.

* cited by examiner

*Primary Examiner* — Marc Somers
(74) *Attorney, Agent, or Firm* — Moser Taboada

(57) ABSTRACT

A method and apparatus for searching the Internet is provided. In one embodiment, a computer implemented method of searching the Internet automatically creates a search query derived from a topic model used by a real time information retrieval service, where the real time information retrieval service produces real time information related to the topic model. The method uses a search engine for searching the Internet for non-real time information related to the search query.

17 Claims, 4 Drawing Sheets

METHOD AND APPARATUS FOR SEARCHING THE INTERNET

CROSS-REFERENCE TO RELATED APPLICATIONS

This application claims benefit of U.S. provisional application Ser. No. 61/349,642, filed May 28, 2010, which is herein incorporated by reference.

BACKGROUND

1. Field of the Invention

Embodiments of the present invention generally relate to Internet searching techniques, and, more particularly, to a method and apparatus for searching the Internet to augment search results of real time information with non-real time information.

2. Description of the Related Art

A variety of search engines have been developed to assist users in locating and retrieving specific useful information from the Internet. Typically, a search engine accepts one or more keywords from a user, performs a search for information containing the keywords and returns links to the information containing the keywords for the user to review. Various services are available which provide ways in which the user is able to search the Internet and retrieve relevant information.

One particular concept utilized by various Internet real time information retrieval services provides the users with customized selections of real time information from the Internet. These services typically utilize models of the user's interest, i.e., mechanisms which are generally connected to a personalized model that has been accumulated over time, to filter information from applications such as really simple syndication (RSS) feeds to provide the user-personalized data of interest to the user. In addition, a user may receive news (an example of real time information) related to specific topics compiled and presented by a news aggregation service.

The various search engines for searching the Internet do not make use of models of the user's interest. However, users may want to see non-real time information in conjunction with their personalized real time information. For example, a user interested in real time information about a certain product type, may find it relevant to have access to, for example, periodic summaries of merger and acquisition (M&A) activities involving companies that make products of a similar type, past news stories about competitors and the like. Such information will not be part of a real time feed as it may have occurred in the past. For example, the M&A activity referred to earlier may have occurred months ago, but may still be relevant to the user's interest. This kind of information can be found through regular search mechanisms. However, regular search mechanisms do not have the relevance and specificity that the user has become accustomed to through real time services.

Therefore, there is a need in the art for a method and apparatus for searching the Internet for personalized and automated non-real time information retrieval to augment real time information.

SUMMARY OF THE INVENTION

Embodiments of the present invention comprise a method and apparatus for searching the Internet. In one embodiment, a computer implemented method of searching the Internet comprises automatically creating a search query derived from a topic model used by a real time information retrieval service, where the real time information retrieval service produces real time information related to the topic model. The method uses a search engine for searching the Internet for non-real time information related to the search query.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

As explained in detail further below, various embodiments of the present disclosure enable access to user-personalized real time as well as non-real time data on the Internet. Some embodiments of the invention are intended to enhance a user's Internet experience while using various Internet information retrieval services. To facilitate searching and presenting personalized information, a real time information retrieval service uses a topic model to define a user's information interests. Embodiments of the invention automatically leverage the topic model and generate search engine queries based on the topic model. The result is non-real time information to augment the real time information. The augmentation of the information retrieval results is automatic, and does not require explicit action by the user.

Figure 1:
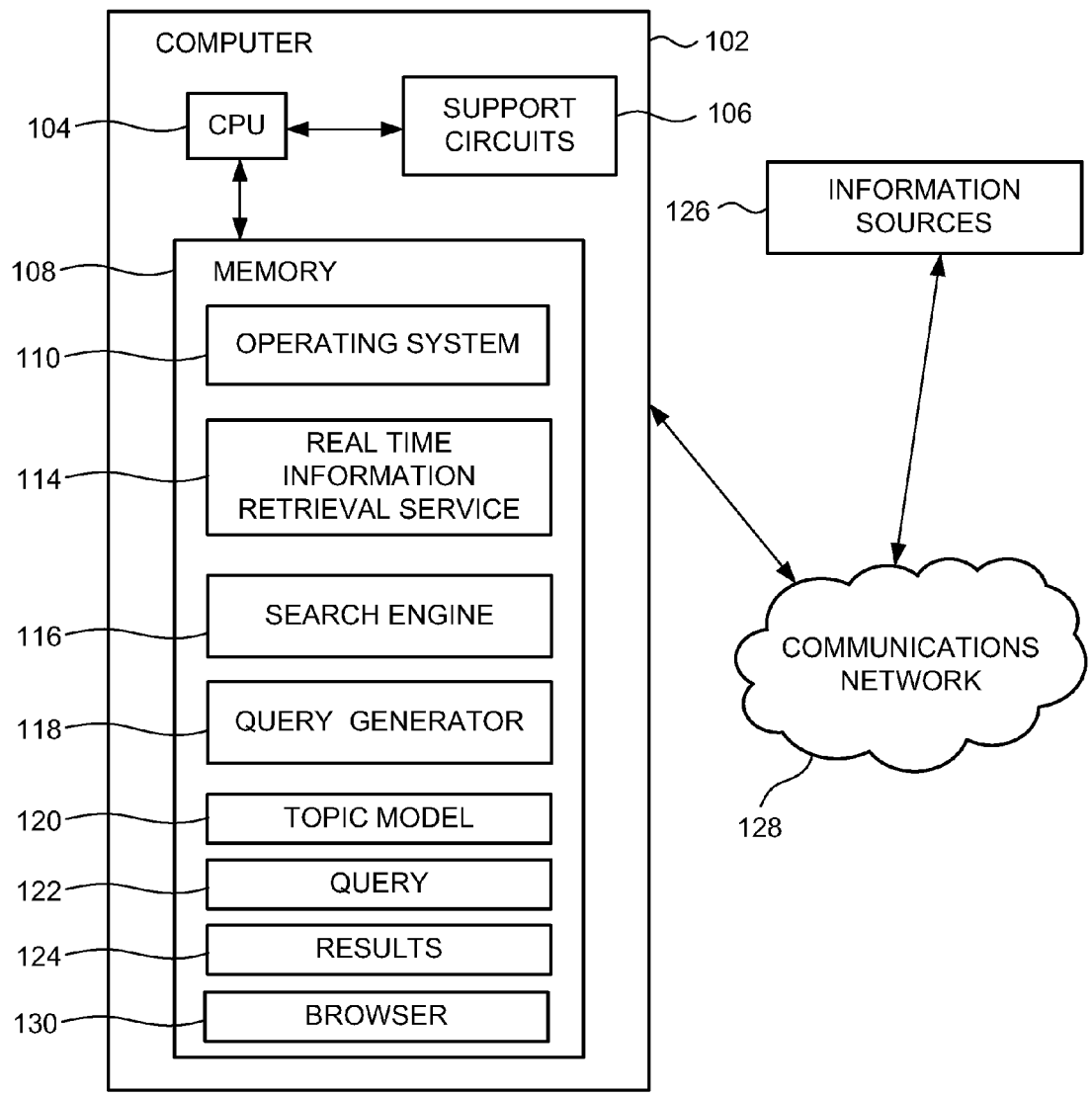
FIG. 1 is a block diagram of a system for searching the Internet, according to one or more embodiments.

FIG. 1 is a block diagram of a system 100 for searching the Internet, according to one or more embodiments. The system 100 includes a computer 102, and an information source 126 operatively coupled to each other through a communications network 128.

Generally, the computer 102 is a type of computing device (e.g., a laptop, a desktop computer, a tablet computer, a Personal Digital Assistant (PDA), a mobile phone and/or the like) known to one of ordinary skill in the art. The computer 102 comprises a Central Processing Unit (CPU) 104, support circuits 106 and a memory 108. The CPU 104 may comprise one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 comprises at least one of Read Only Memory (ROM), Random Access Memory (RAM), disk drive storage, optical storage, removable storage and/or the like. The memory 108 comprises operating system (OS) 110, a real time information retrieval service 114, a search engine 116, a query generator 118, a topic model 120, a search query 122 and results 124. The system 100 is capable of interactions with various information sources 126 through the communications networks 128.

According to some embodiments, the operating system (OS) 110 generally manages various computer resources (e.g., network resources, data storage resources, file system resources and/or the like). The operating system (OS) 110 is configured to execute operations on one or more hardware and/or software devices, such as Network Interface Cards (NICs), hard disks, virtualization layers, firewalls and/or the like. For example, the various software packages call commands associated with the operating system (OS) 110 (i.e., native operating system commands) to perform various file system and/or storage operations, such as creating files or metadata, writing data to the files, reading data from the files, modifying metadata associated with the files and/or the like. The operating system (OS) 110 may call one or more functions associated with a browser 130 to execute various web browsing operations.

According to some embodiments, the communication network 128 comprises a communication system that connects computer systems by wire, cable, fiber optic and/or wireless link facilitated by various types of well-known network elements, such as hubs, switches, routers, and the like. The communication network 128 may employ various well-known protocols to communicate information amongst the network resources. For example, the communication network 128 may be a part of the Internet or Intranet using various communications infrastructure such as Ethernet, WIFI, WIMAX, General Packet Radio Service (GPRS), and the like.

According to some embodiments, the real time information retrieval service 114 retrieves relevant real time information from the Internet. According to some embodiments, the real time information offers information that is specific and relevant to a topic of interest to a user. Real time information on the Internet is commonly available in the form of feeds, provided as an online service by websites to users who access these websites. Examples of real time information retrieval services include browser plug-ins or feeds from services such as C2RSS or TRAPIT (previously CHATTER TRAP).

The topic model 120 is defined to be a type of statistical model for discovering the abstract topics that occur in information available on the Internet. Such information may include any information that is retrievable by a real time information retrieval service including, for example, but not limited to, documents, emails, tweets, blog entries, articles, RSS feeds, and the like. The topic model 120 is automatically built from the most salient terms and term relationships as determined statistically from terms contained in information in which the user has previously expressed interest (e.g., chosen to read). For example, articles that have been read by the user and/or found to be useful to the user are compared to articles which have not been read or found to be useful by the user. The goal is to identify terms to be included in the topic model that will provide the most relevant real time information. Sometimes the statistical model is seeded by or enhanced by terms explicitly chosen by the user.

The topic model 120 is then used to select real time Internet information that is relevant to one or more of the user's topics of interest. The real time information retrieval service uses the topic model to define the real time information that is to be accessed and presented to a user. According to some embodiments, the search engine 116 finds relevant non-real time information from the Internet. The real time information retrieval service 114 uses the search engine 116 to periodically and proactively search for items of interest on the Internet. This search engine 116 utilizes the most salient terms from the topic model as a search query 122 to search the Internet. The search engine 116 may be a stand-alone Internet service designed for this purpose, i.e., providing non-real time information to augment real time information. The real time information retrieval service 114 takes advantage of the fact that certain data which is explicitly indexed on a web site and given a high position by popular search engines is likely to be less transient than the real time information, e.g., such information will be non-real time. For example, it might be useful to occasionally add older articles about health care to a feed of real time information relating to the health care topic in order to provide context and waypoints. Older stored information (i. e. non-real time information) is more likely to contain a summary or analysis than the real time information.

According to some embodiments, the search query 122 is derived from the most salient terms of the topic model 120. A search query generator 118 derives the relevant search query based on the most salient terms of the topic model as described in detail with respect to FIG. 4. Therefore, the query will be tailored to the topic of interest of the user.

According to some embodiments, the results 124 obtained are the final outcome of the combined real time as well as non-real time articles that are relevant to the user's interest as defined by the topic model.

According to some embodiments, the information source(s) 126 comprise one or more web pages hosted on web servers, various content (e.g., dynamic or static content in the form of images, video and/or audio), online services (e.g., social networking), applications, databases and/or the like. An Internet resource may be referenced by a URL (Uniform Resource Locator) or a domain name (e.g., www.uspto.gov). The information source(s) 126 may be accessed by the user of the computer 102 through a browser 130. The real time information retrieval service 114 and search engine 116 may be browsers or plug-ins for a browser 130. In accordance with embodiments of the present invention, service 114 and search engine 116 facilitate access and presentation of real time and non-real time information.

Figure 2:
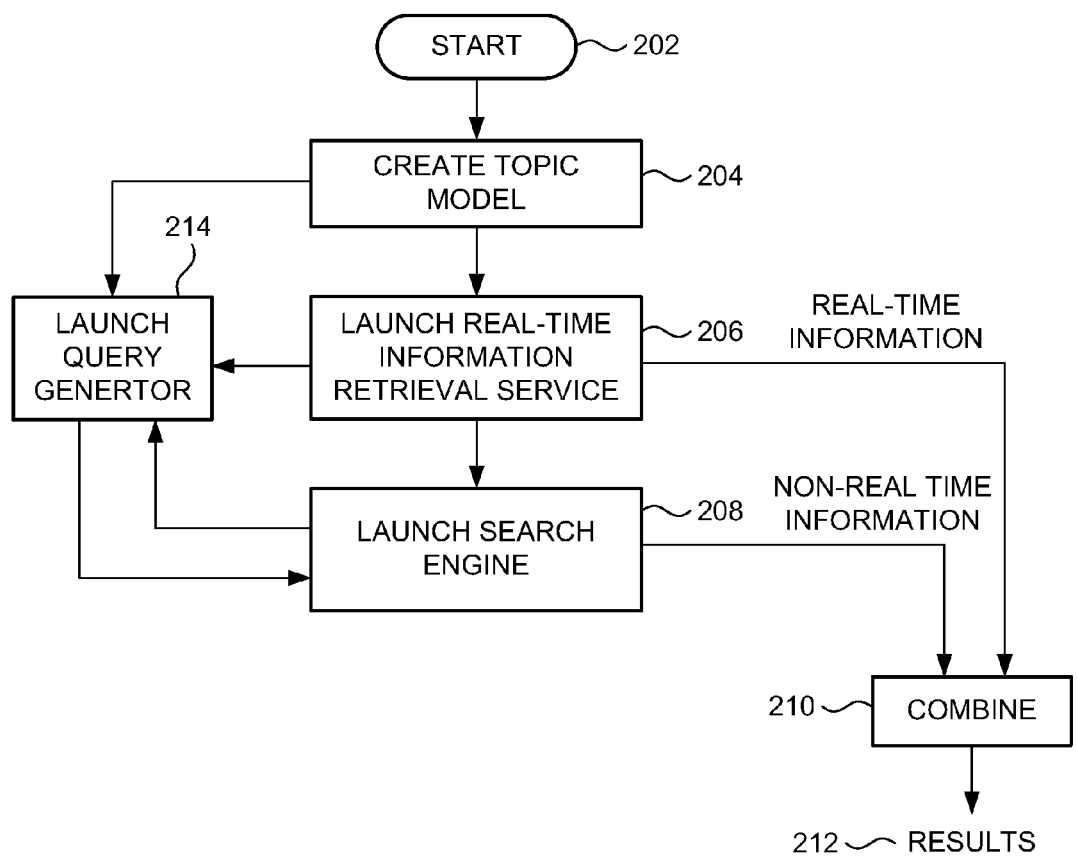
FIG. 2 is a flow diagram of a method for providing non-real time search results to augment real time search results according to one or more embodiments.

FIG. 2 is a flow diagram of a method 200 to provide non-real time search results in addition to real time information, according to one or more embodiments.

The method 200 starts at step 202 and proceeds to step 204. At step 204, a topic model (e.g., the topic model 120 of FIG. 1) is created by the system based on user behavior. In an embodiment, the topic model is defined to be a type of statistical model that represents the abstract topics that occur in information available on the Internet. In some embodiments, the model may be seeded with user selected terms or conditions. At step 206, a real time information retrieval service (e.g., the real time information retrieval service 114 of FIG. 1) is launched. According to some embodiments, based on the topic model 120 (at step 204), the real time information retrieval service 114 is launched to retrieve relevant real time information from the Internet.

At step 208, a search engine (e.g., the search engine 116 of FIG. 1) is launched. According to some embodiments, the search engine 116 finds relevant non-real time information from the Internet using a search query derived from the topic model. Operation of the search engine is described with respect to FIG. 3.

At step 214, the method 200 periodically launches the query generator (e.g., query generator 118 of FIG. 1) in connection with either the launch of the retrieval service, the search engine, or both. The query generator automatically derives a search query from the topic model for use by the search engine.

At step 210, the retrieved real time information and the non-real time information are combined. At step 212, the combined information is presented as a result and is made available to the user.

Figure 3:
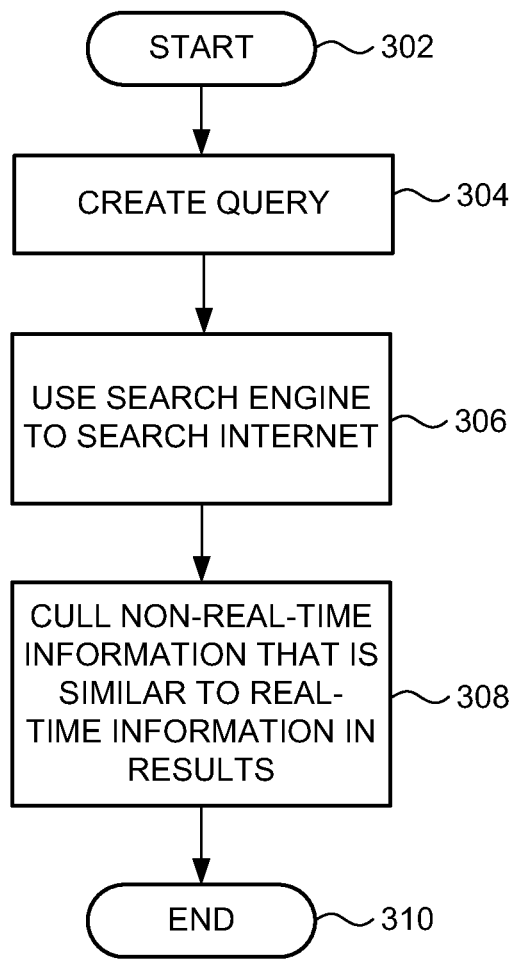
FIG. 3 is a flow diagram of a method for culling non-real time information that is similar to real time information in results, according to one or more embodiments.

FIG. 3 is a flow diagram of a method 300 for generating non-real time information to augment real time information produced by a real time information retrieval service, according to one or more embodiments.

The method 300 starts at step 302 and proceeds to step 304. At step 304, a search query (e.g., the search query 122 of FIG. 1) is created. In some embodiments, the search query is created as described with respect to FIG. 4. At step 306, a search engine is used to search the Internet using the query. According to some embodiments, the search engine searches the Internet for relevant non-real time information.

At step 308, non-real time information that is similar to real time information previously identified by the real time information retrieval service is culled from the results. According to some embodiments, the results are created by checking for similarity with information provided to the user in the real time feed. In order to check similarity between the non-real time information and the real time-information, a representation of the real time information is computed and then a representation of the non-real time information is computed. A comparison is performed between the two particular representations to determine the number of same or similar terms and term relationships. If the count of similar/same terms exceeds a predefined threshold number, the non-real time representation will be deemed similar/same as the real time representation and merit removal from the search results. It is to be appreciated by those having ordinary skill in the art that there may be any number of other methods to compute similarity of two given articles. The method 300 proceeds to step 310, where the method 300 ends.

Figure 4:
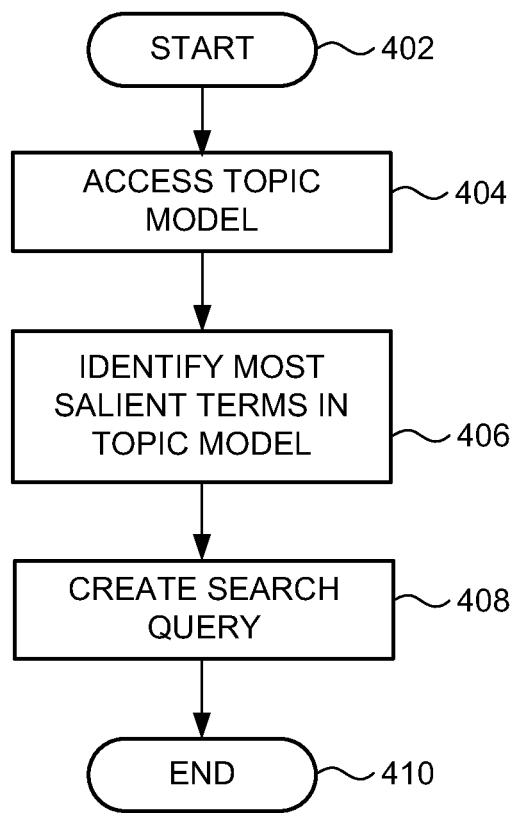
FIG. 4 is a flow diagram of a method for creating a search query, according to one or more embodiments.

FIG. 4 is a flow diagram of a method 400 for automatically creating a search query, according to one or more embodiments. The method 400 starts at step 402 and proceeds to step 404. At step 404, a topic model (e.g., the topic model 120 of FIG. 1) is accessed.

At step 406, the most salient terms in the topic model are identified. At step 408, a search query is automatically created using information from step 406. To identify salient terms, the method may search the topic model for terms that have been weighted highly based on their prior success in predicting user interest, terms that are related to such terms, terms that are used frequently (excluding common words such as "the", "a", etc.), or other term characteristics. It is to be appreciated by those having ordinary skill in the art that there may be any number of other methods to compute the salience of terms. Based on the most salient terms of the topic model, the method 400 automatically creates the search query. The method 400 proceeds to step 410, at which the method 400 ends.

The embodiments of the present invention offer various advantages. The method of the present invention enables context setting, enriching of the real time information with relevant older, non-real time information. The present invention provides the same level of relevance and specificity that the Internet information retrieval service systems achieve for real time data. The search results provided by the present invention offers a level of automation and personalization, i.e. tailored to the interests of individual users, not provided by any other Internet search service.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, modules and circuits are described above in association with their respective functions. These elements, devices, modules and circuits are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A computer implemented method of searching the Internet for a user comprising:
   generating a topic model comprising a set of salient terms at least in part determined statistically from a comparison of an occurrence of a plurality of terms contained in selected items of real-time online information which the user has previously chosen to view with an occurrence of said terms in a body of real-time online information available through a real-time information retrieval service, wherein the body of real-time online information comprises other items of real-time online information which the user has not previously chosen to view;
   retrieving, by the real time information retrieval service, additional items of online real-time information related to the topic model;
   automatically creating a search query derived from the set of salient terms in the topic model;
   using a search engine to search a body of non-real time information on the Internet, different than the body of real-time online information, for items of non-real time information responsive to the search query; and
   presenting to the user the additional items of online real-time information and the items of non-real time information responsive to the search query, as a result relevant to the user's interest.

2. The method of claim 1 further comprising accessing a plurality of information sources through a communication network to retrieve the non-real time information.

3. The method of claim 1 further comprising culling non-real time information that is considered redundant with the related real time information.

4. The method of claim 1 wherein automatically creating the search query is performed by a plug-in for a browser.

5. The method of claim 1 further comprising automatically creating the search query using salient terms from the topic model.

6. The method of claim 5 wherein automatically creating the search query further comprises:
   selecting at least one term from the topic model for the search query, where the at least one term is at least one of a highly weighted term based on the at least one term's prior success in predicting user interest, a term that is related to such a highly weighted term, or a term that is used frequently in the topic model.

7. An apparatus for searching the Internet for user comprising one or more processors for executing:
   a real-time information retrieval service configured for generating a topic model comprising a set of salient terms at least in part determined statistically from a comparison of an occurrence of a plurality of terms contained in selected items of real-time online information which the user has previously chosen to view with an occurrence of said terms in a body of real-time online information available through the real-time information retrieval service which also retrieves additional items of online real-time information related to the topic model, where the body of real-time information comprises other items of real-time online information which the user has not previously chosen to view;
   a search query generator for automatically deriving creating a search query derived from the set of salient terms in the topic model;
   a search engine for searching a body of non-real time information on the Internet, different than the body of real-time online information, for items of non-real time information responsive to the search query; and
   wherein, the search engine is further configured to present to the user the additional items of online real-time information and the items of non-real time information responsive to the search query as a result relevant to the user's interest.

8. The apparatus of claim 7 further comprising a plurality of information sources that are accessible through a communication network to retrieve the non-real time information.

9. The apparatus of claim 7 wherein the real time information retrieval service culls non-real time information that is deemed to be redundant with the related real time information.

10. The apparatus of claim 7 wherein the search engine is a plug-in for a conventional browser.

11. The apparatus of claim 7 wherein the search query generator automatically creates the search query using salient terms from the topic model.

12. The apparatus of claim 11 wherein the search query generator automatically creates the topic model by selecting at least one term from the topic model for the search query, where the at least one term is at least one of a highly weighted term based on the at least one term's prior success in predicting user interest, a term that is related to such a highly weighted term, or a term that is used frequently in the topic model.

13. A non-transitory computer-readable-storage medium comprising one or more processor-executable instructions that, when executed by at least one processor, causes the at least one processor to perform a method comprising:
   generating a topic model comprising a set of salient terms at least in part determined statistically from a comparison of an occurrence of a plurality of terms contained in selected items of real-time online information which a user has previously chosen to view with an occurrence of said terms in a body of real-time online information through a real-time information retrieval service, wherein the body of real-time online information comprises other items of real-time online information which the user has not previously chosen to view;
   retrieving, by the real time information retrieval service, additional items of online real-time information related to the topic model;
   automatically creating a search query derived from the set of salient terms in the topic model;
   using a search engine to search a body of non-real time information on the Internet, different than the body of real-time online information, for items of non-real time information responsive to the search query; and
   presenting to the user the additional items of online real-time information and the items of non-real time information responsive to the search query, as a result relevant to the user's interest.

14. The computer-readable-storage medium of claim 13 further comprising accessing a plurality of information sources through a communication network to retrieve the non-real time information.

15. The computer-readable-storage medium of claim 13 further comprising culling non-real time information that is deemed redundant to the related real time information.

16. The computer-readable-storage medium of claim 13 wherein automatically creating the search query is performed by a plug-in for a browser.

17. The computer-readable-storage medium of claim 13 further comprising automatically creating the search query using salient terms from the topic model.

* * * * *